United States Patent
Lee

(10) Patent No.: US 7,490,337 B2
(45) Date of Patent: Feb. 10, 2009

(54) DOOR OPENING STRUCTURE FOR CAR MULTIMEDIA SYSTEM

(75) Inventor: Gi-Seok Lee, Kyunggi-do (KR)

(73) Assignee: Hyundai Autonet, Co. Ltd., Incheon-Gyeonggi-Do (KR)

( * ) Notice: Subject to any disclaimer, the term of this patent is extended or adjusted under 35 U.S.C. 154(b) by 720 days.

(21) Appl. No.: 11/008,237

(22) Filed: Dec. 10, 2004

(65) Prior Publication Data

US 2006/0095931 A1    May 4, 2006

(30) Foreign Application Priority Data

Nov. 3, 2004    (KR) ...................... 10-2004-0088596

(51) Int. Cl.
*G11B 33/02* (2006.01)
(52) U.S. Cl. ...................... 720/647; 720/646
(58) Field of Classification Search ............... 720/646, 720/647
See application file for complete search history.

(56) References Cited

U.S. PATENT DOCUMENTS

| 4,530,081 | A | * | 7/1985 | Sakurai et al. | 720/647 |
| 4,539,669 | A | * | 9/1985 | Miyakawa et al. | 720/647 |
| 5,006,940 | A | * | 4/1991 | Hamachi et al. | 360/92.1 |
| 5,862,468 | A | * | 1/1999 | Kim | 455/321 |
| 6,111,725 | A | * | 8/2000 | Christie | 360/132 |
| 6,122,140 | A | * | 9/2000 | Sato | 360/99.02 |
| 2003/0106953 | A1 | * | 6/2003 | Hiraguchi et al. | 242/348.2 |

FOREIGN PATENT DOCUMENTS

KR    1999-013795    4/1999

OTHER PUBLICATIONS

English language Abstract of JP1999-013795.

* cited by examiner

*Primary Examiner*—Andrea L Wellington
*Assistant Examiner*—Carlos E Garcia
(74) *Attorney, Agent, or Firm*—Greenblum & Bernstein, P.L.C.

(57) ABSTRACT

A door opening structure for a car multimedia system includes a housing, a front panel provided on a side thereof with an opening and combined with the housing, a trim plate combined with the front panel and a door configured to selectively open and close the opening while sliding along the trim plate.

4 Claims, 3 Drawing Sheets

[FIG. 1a]  PRIOR ART
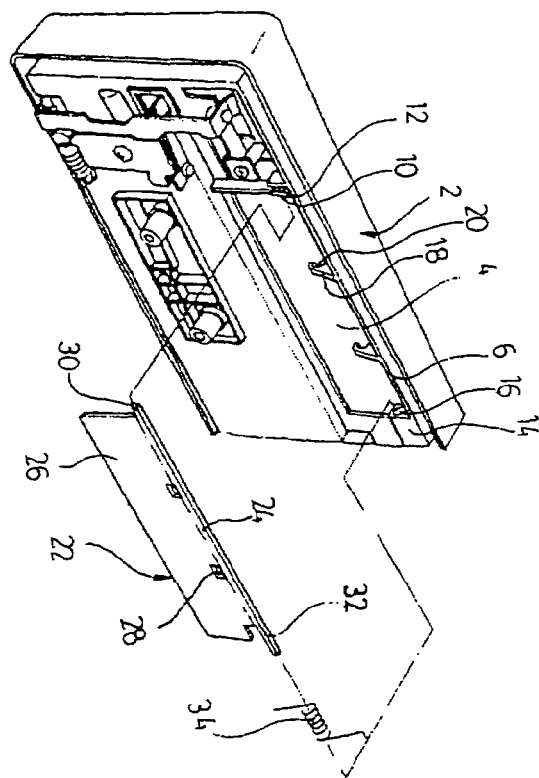
[FIG. 1b]  PRIOR ART
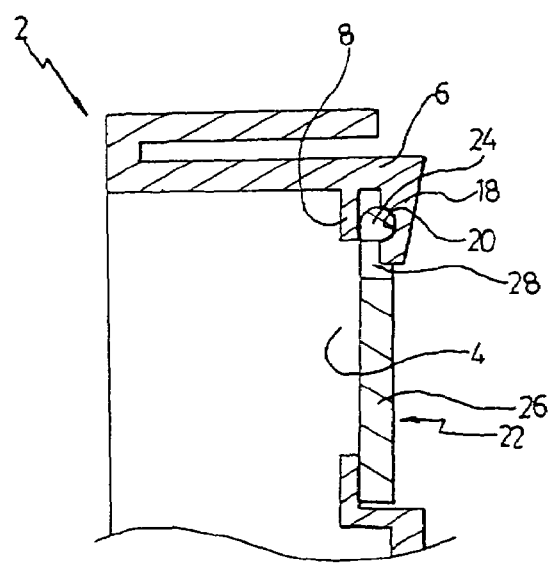

DOOR OPENING STRUCTURE FOR CAR MULTIMEDIA SYSTEM

RELATED APPLICATIONS

The present disclosure relates to subject matter contained in priority Korean Application No. 10-2004-0088596, filed on Nov. 3, 2004, which is herein expressly incorporated by reference in its entirety.

BACKGROUND OF THE INVENTION

1. Field of the Invention

The present invention relates generally to a car multimedia system and, more particularly, to a door opening structure for a car multimedia system, which can assure stability during the opening and closing of a door and increase the quality of a product by improving the manipulation of the door.

2. Description of the Related Art

In general, in a car audio system provided in an automobile for the sake of a driver and passengers, a plurality of devices, such as a tuner, a cassette deck and a Compact Disk (CD) player, is integrated with an amplifier, so that multiple functions can be performed. Furthermore, a control panel (front panel) provided with a plurality of knobs is placed on the front of the car audio system, which is constructed as described above, to perform mode selection and function control for the devices.

An opening is formed in the front of the control panel to receive a cassette tape or CD. A door is provided in the opening to prevent the entrance of impurities by closing the opening, thus preventing impurities such as dust from entering into the body of the car audio system from the outside of the system while the cassette deck is not in use.

Meanwhile, there are many types of door opening structures that are applied to car multimedia systems. An example of the door opening structures is disclosed in Korean Unexamined Utility Model Publication No. 1999-013795.

Korean Unexamined Utility Model Publication No. 1999-013795 discloses a door opening structure for a car audio system, in which guide ribs are disposed between support ribs formed in an opening, thus facilitating an operation of attaching a door to the control panel.

As shown in FIGS. 1a and 1b, the door opening structure for a car audio system includes a control panel 2 in which support ribs 10 and 14 are formed on both sides of an opening 4 and guide ribs 18 are formed between the support ribs 10 and 14, and a cassette door 22 that is attached to the support ribs 10 and 14.

Support holes 12 and 16 are formed through the support ribs 10 and 14, respectively, to accommodate pins 30 and 32 that project from both sides of the cassette door 22. The guide ribs 18 are each provided, on the lower portion of the inside thereof, with a recess 20, into which the portion of the shaft part 24 of the cassette door 22 located above a corresponding longitudinal hole 28 is inserted.

The portions of the guide ribs 18 located below the recesses 20 are fitted into the corresponding longitudinal holes 28 of the cassette door 22.

The cassette door 22 includes a shaft part 24 adapted to have a length identical to that of the opening 4 of the control panel 2 to be fitted into the opening 4, and a blocking part 26 attached to the lower end of the shaft part 24 to block the opening 4.

The shaft part 23 of the cassette door 22 is provided at both ends thereof with pins 30 and 32 that are inserted into the support holes 12 and 16 of the support ribs 10 and 14, respectively. A torsion spring 34 is fitted over one of the pins 30 and 32 of the cassette door 22 to provide a restoring force to the cassette door 22.

The operation of the cassette door support structure for a car audio system is described below.

When a cassette tape has been drawn from the opening 4 formed through the control panel 2, the blocking part 26 of the cassette door 22 is rotated clockwise around the shaft part 24 of the cassette door 22 by the tension of the torsion spring 34 fitted over one pin 32 of the cassette door 22 and blocks the opening 4 of the control panel 2, thus preventing impurities, such as dust, from infiltrating into the body of the car audio system.

In contrast, when a cassette tape needs to be inserted through the opening 4 to be played, the blocking part 26 of the cassette door 22 is rotated counterclockwise around the shaft part 24 of the cassette door 22 by the force of inserting the cassette tape, so that the opening is fully opened, thus allowing the cassette tape to be loaded into the car audio system.

Meanwhile, the cassette door 22 is supported by the guide ribs 18, so that the cassette door 22 or the shaft part 24 of the cassette door 22 is not bent even though a cassette tape is forcibly inserted into the opening 4 of the control panel 2.

SUMMARY OF THE INVENTION

Accordingly, the present invention has been made keeping in mind the above problems occurring in the prior art, and an object of the present invention is to provide a door opening structure for a car multimedia system, in which a door is selectively opened and closed while sliding downward and upward along dual guide slits, so that the opening and closing of the door are stably performed, and in which a spring is interposed between the door and a trim plate, so that the forward and backward movement of the door can be prevented using the tension of the spring during the opening and closing of the door, thus improving the sensation of manipulation.

In order to accomplish the above object, the present invention provides a door opening structure for a car multimedia system, including a housing; a front panel provided on a side thereof with an opening and combined with the housing; a trim plate combined with the front panel; and a door configured to selectively open and close the opening while sliding along the trim plate.

Preferably, the door opening structure further includes a spring between the door and the trim plate.

Preferably, the door is provided on both sides thereof with projections and the trim plate is provided with guide slits to accommodate and guide the projections, the door moving upward and downward along the guide slits to be selectively closed and opened.

Preferably, each of the guide slits includes a straight part through which each of the projections moves linearly, and a curved part that extends forward from the upper end of the straight part to form a gentle curve.

Preferably, the spring includes a door support supported on a back surface of the door, and at least one trim plate support diagonally extended from the lower end of the door support and supported on the front surface of the trim plate.

Preferably, the trim plate is provided on the front surface thereof with at least one inclined part on which the trim plate supports of the spring are supported during the opening and closing of the door.

Preferably, the guide slits are formed at least in the upper and lower portions of each side of the trim plate.

BRIEF DESCRIPTION OF THE DRAWINGS

The above and other objects, features and advantages of the present invention will be more clearly understood from the following detailed description taken in conjunction with the accompanying drawings, in which:

FIG. 1a is a perspective view showing a conventional door opening structure for a car multimedia system;

FIG. 1b is a sectional view of FIG. 1a;

DESCRIPTION OF THE PREFERRED EMBODIMENTS

Figure 2:
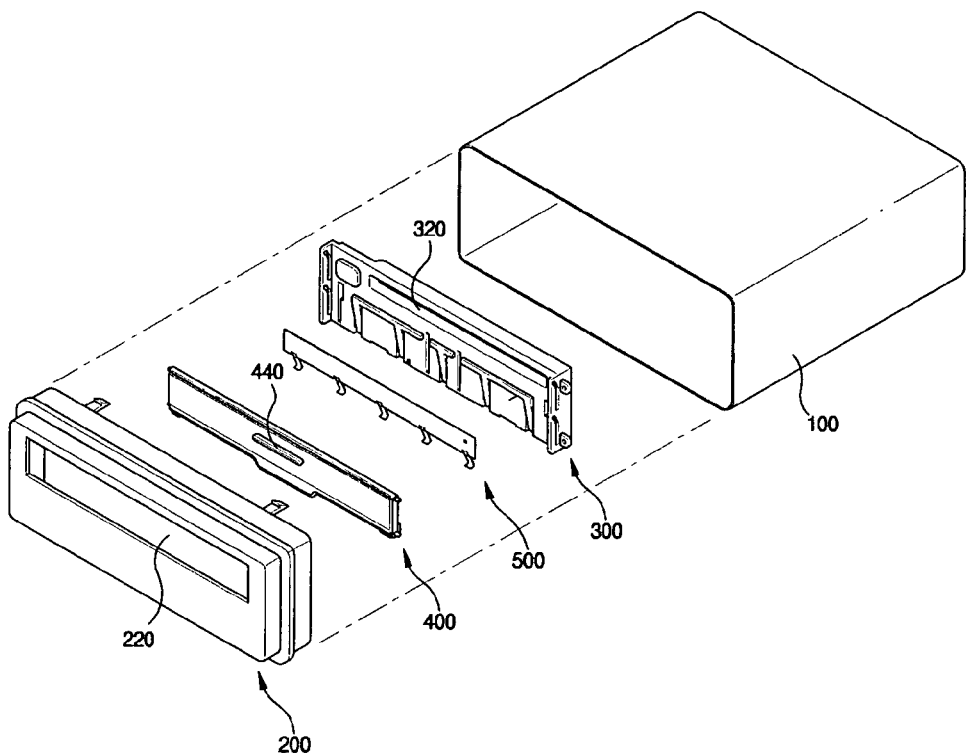
FIG. 2 is an exploded perspective view showing a door opening structure for a car multimedia system in accordance with an embodiment of the present invention.

Reference now should be made to the drawings, in which the same reference numerals are used throughout the different drawings to designate the same or similar components.

Figure 3:
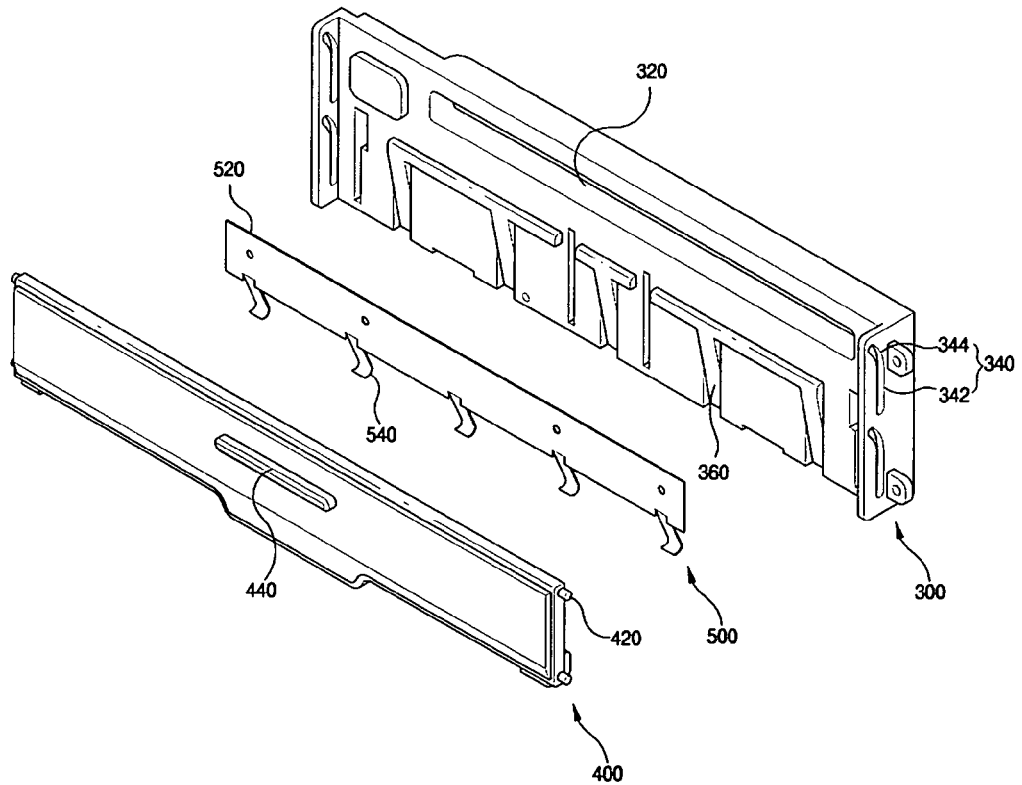
FIG. 3 is an enlarged view showing the principal elements of FIG. 2.
Figure 4:
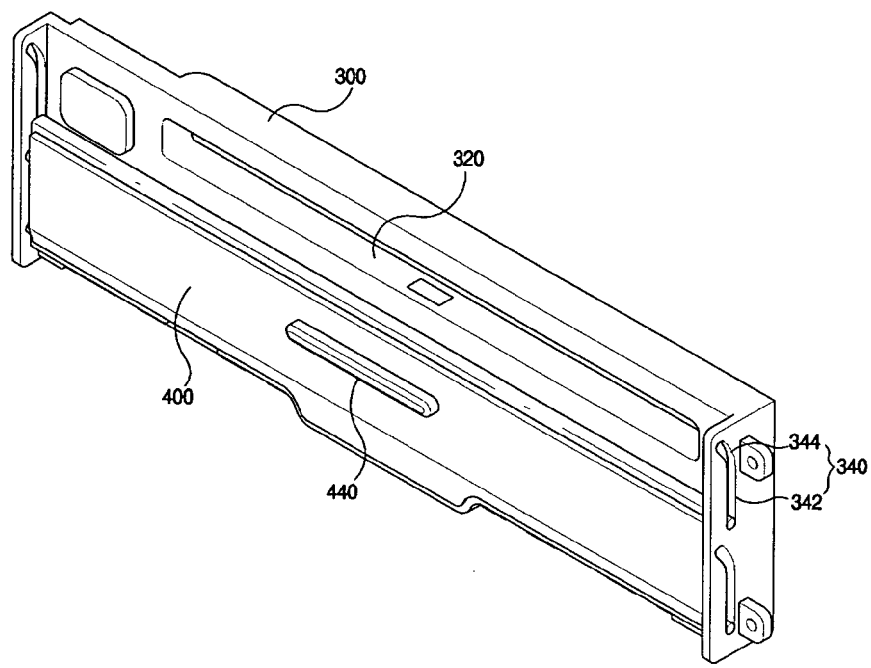
FIG. 4 is a view showing a structure into which the elements of FIG. 3 are assembled.
Figure 5:
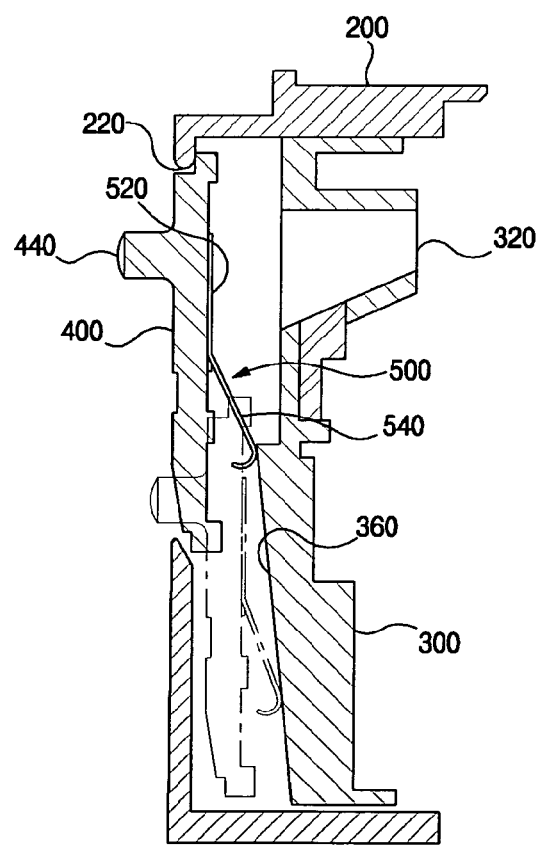
FIG. 5 is a sectional view of the structure shown in FIG. 4.

FIG. 2 is an exploded perspective view showing the door opening structure for a car multimedia system in accordance with an embodiment of the present invention. FIG. 3 is an enlarged view showing the door, trim plate and spring of FIG. 2. FIG. 4 is a view showing a structure into which the elements of FIG. 3 are assembled. FIG. 5 is a sectional view of the structure shown in FIG. 4.

Referring to FIGS. 2 to 5, the door opening structure of the multimedia system according to the present invention includes a housing 100, a front panel 200 attached to the front of the housing 100, a trim plate 300 attached to the back of the front panel 200, and a door 400 supported by the trim plate 300 to slide upward and downward An opening 220 is formed in the upper portion of the front panel 200 to receive a cassette tape or CD.

Furthermore, a cassette slot 320 is formed in the upper portion of the trim plate 300 at a location corresponding to that of the opening 220 to receive a cassette tape or CD.

Guide slits 340 are formed in both sides of the trim plate 300 to support the door 400 and allow the door 400 to slide upward and downward. Projections 420 extending to the outside of the door 400 are provided on both sides of the door 400 to be inserted into the guide slits 340.

The door 400 slides in such a way that the projections 420 are guided along the guide slits 340, and functions to selectively open and close the opening 220 formed in the front panel 200.

Specifically, each of the guide slits 340 includes a straight part 342 where the door 400 slides along a straight path, and a curved part 344 where the door 400 slides along a curved path and which extends forward from the upper end of the straight part 342.

At least two guide slits 340, as shown in FIG. 3, are preferably formed at least in upper and lower portions of both sides of the trim plate 300.

With this construction, the door 400 slides with four projections 420 formed on both sides of the door 400 being inserted into four guide slits 340, so that the opening and closing of the door 400 can be stably performed from a structural point of view.

A grip 440 projecting forward is placed on the front of the door 400 to allow a user to control the opening and closing operation of the door 400.

In the meantime, the present invention further includes a spring 500 that is supported between the door 400 and the trim plate 300.

The spring 500 is preferably fabricated in plate spring form to apply tension over the entire door 400.

In detail, the spring 500 includes a door support part 520 supported on the back of the door 400, and a plurality of trim plate supports 540 diagonally extended from the lower end of the door support part 520 and supported on the front surface of the trim plate 300.

Inclined parts 360, which directly come into contact with the trim plate supports 540 and are inclined at a uniform angle, are formed on the front of the trim plate 300.

In this case, the inclined parts 360 are preferably formed in the direction in which the trim plate supports 540 are inclined.

The operation of the present invention is described with reference to the accompanying drawings below.

When the closed door 400 needs to be opened, the grip 440 of the door 400 is held and pulled downward. Accordingly, as the projections 420 formed on the door 400 are guided along the paths that each connect the curved part 344, which is formed on the upper side of the guide slit 340, with the straight part 342, which is formed on the lower side of the guide slit 340, the door 400 slides downward, thereby opening the front panel 200.

During the sliding of the door 400, tension caused by the spring 500 is continually applied to the front side of the door 400, so that the door 400 can perform a stable sliding operation without forward or backward movement.

Meanwhile, during the downward movement of the door 400, the trim plate supports 540 move downward along the inclined parts 360 while being in contact with the inclined parts 360 formed on the trim plate 300, so that tension caused by the trim plate supports 540 gradually decreases as the trim plate supports 540 move from the upper portions of the inclined parts 360 to the lower portions of the inclined parts 360.

As a result, the door 400 operates with resistance in an early stage and then operates smoothly in an opened stage, so that the manipulation of the door 400 is sophisticated.

Furthermore, since the door 400 is configured to slide while engaging with the guide slits 340 that are arranged on the upper and lower portions of the trim plate 300, the opening and closing of the door 400 can be stably performed from a structural point of view.

When the opening 220 of the front panel 200 is opened by the downward movement of the door 400, a cassette tape or CD is inserted through the cassette slot 320 formed in the trim plate 300 and then a multimedia system is operated.

In the meantime, when the opened door 400 needs to be closed, the grip 440 of the door 400 is held and pushed upward. As a result, the door 400 is closed through an operating mechanism opposite to the above-described operating mechanism, and similar effects can be achieved. The door opening structure for a car multimedia system in accordance with the present invention can be adapted and applied to various door structures into which various storage/recording media, such as a cassette tape and an audio/video CD for use in an audio/video system, and a navigation CD for use in a navigation system, are inserted.

In accordance with the above-described invention, the following effects can be achieved.

First, the door slides upward and downward along the trim plate and the opening of the front panel for receiving a tape or disk is selectively opened and closed, the opening and closing of the door is simply and conveniently performed, and the door opening structure different from a conventional hinge structure is applied to products, thus increasing the variety of products and improving the competitive power of products.

Second, the spring is interposed between the door and the trim plate, so that the forward and backward movement of the door can be prevented during the upward and downward movement of the door using tension caused by the spring.

Third, the door slides while engaging with guide slits that are formed in the upper and lower portions of the sides of the trim plate, so that the opening and closing of the door can be stably performed from a structural point of view.

Fourth, each of the guide slits is composed of the straight part and the curved part extending forward, so that during the downward movement of the door, considerable downward movement is performed after slight backward movement, whereas during the upward movement of the door, slight forward movement is performed after considerable upward movement, thus providing an upgraded and sophisticated operating mechanism.

Fifth, the inclined parts are formed on the trim plate and the trim plate supports of the spring come into contact with the inclined parts of the trim plates, so that the door 400 operates with resistance in an early stage and then operates smoothly in an opened stage, thus sophisticating the manipulation of the door and improving the competitive ability of the products.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A door opening structure for a car multimedia system, comprising:
   a housing;
   a front panel provided on a side thereof with an opening and combined with the housing;
   a trim plate combined with the front panel, said trim plate having a front surface extending along the front panel;
   a door configured to selectively open and close the opening while sliding along the trim plate; and
   a plate spring supported between the door and the front surface of the trim plate;
   wherein the door is provided on both sides thereof with projections and the trim plate is provided with guide slits to accommodate and guide the projections, the door moving upward and downward along the guide slits to be selectively closed and opened;
   wherein each of the guide slits includes a straight part through which each of the projections moves linearly, and a curved part that extends forward from an upper end of the straight part to form a gentle curve; and
   wherein the plate spring includes a door support supported on a back surface of the door, and at least one trim plate support diagonally extended from a lower end of the door support and supported on the front surface of the trim plate.

2. A door opening structure for a car multimedia system, comprising:
   a housing;
   a front panel provided on a side thereof with an opening and combined with the housing;
   a trim plate combined with the front panel, said trim plate having a front surface extending along the front panel;
   a door configured to selectively open and close the opening while sliding along the trim plate; and
   a plate spring supported between the door and the front surface of the trim plate;
   wherein the door is provided on both sides thereof with projections and the trim plate is provided with guide slits to accommodate and guide the projections, the door moving upward and downward along the guide slits to be selectively closed and opened;
   wherein each of the guide slits includes a straight part through which each of the projections moves linearly, and a curved part that extends forward from an upper end of the straight part to form a gentle curve; and
   wherein the plate spring includes a door support supported on a back surface of the door, and at least one trim plate support diagonally extended from a lower end of the door support and supported on the front surface of the trim plate; and
   wherein the trim plate is provided on a front surface thereof with at least one inclined part on which the trim plate supports are supported during opening and closing of the door.

3. The door opening structure as set forth in claim 1, wherein the guide slits are formed at least in upper and lower portions of each side of the trim plate.

4. A door opening structure for a car multimedia system, comprising:
   a housing;
   a front panel provided on a side thereof with an opening and combined with the housing;
   a trim plate combined with the front panel, said trim plate having a front surface extending along the front panel;
   a door configured to selectively open and close the opening while sliding along the trim plate; and
   a plate spring supported between the door and the front surface of the trim plate;
   wherein the door is provided on both sides thereof with projections and the trim plate is provided with guide slits to accommodate and guide the projections, the door moving upward and downward along the guide slits to be selectively closed and opened;
   wherein each of the guide slits includes a straight part through which each of the projections moves linearly, and a curved part that extends forward from an upper end of the straight part to form a gentle curve; and
   wherein the plate spring includes a door support supported on a back surface of the door, and at least one trim plate support diagonally extended from a lower end of the door support and supported on the front surface of the trim plate;
   wherein the trim plate is provided on a front surface thereof with at least one inclined part on which the trim plate supports are supported during opening and closing of the door; and
   wherein the guide slits are formed at least in upper and lower portions of each side of the trim plate.

* * * * *